United States Patent [19]
Sato

[11] Patent Number: 4,864,392
[45] Date of Patent: Sep. 5, 1989

[54] IMAGE PROCESSING APPARATUS FOR LOGARITHMICALLY CONVERTING AN IMAGE INPUT SIGNAL INTO A DENSITY SIGNAL AND STANDARDIZING THE INPUT RANGE OF THE IMAGE INPUT SIGNAL WITH THE SAME CONVERSION TABLE

[75] Inventor: Hiroaki Sato, Yokohama, Japan

[73] Assignee: Canon Kabushiki Kaisha, Tokyo, Japan

[21] Appl. No.: 158,046

[22] Filed: Feb. 16, 1988

Related U.S. Application Data

[63] Continuation of Ser. No. 23,908, Mar. 11, 1987, abandoned, which is a continuation of Ser. No. 586,069, Mar. 5, 1984, abandoned.

[30] Foreign Application Priority Data

Mar. 8, 1983 [JP] Japan ..................... 58-36728

[51] Int. Cl.$^4$ ................ G03F 3/08; H04N 1/40; H04N 1/46
[52] U.S. Cl. ........................... 358/80; 358/75; 358/443; 358/447
[58] Field of Search ............ 358/169, 280, 282, 283, 358/75, 78, 80, 82, 164, 284

[56] References Cited

U.S. PATENT DOCUMENTS

| | | | |
|---|---|---|---|
| 3,893,166 | 7/1975 | Pugsley | 358/80 |
| 4,204,223 | 5/1980 | Gast et al. | 358/80 |
| 4,346,402 | 8/1982 | Pugsley | 358/80 |
| 4,371,260 | 2/1983 | Yoshimoto et al. | 358/75 |
| 4,402,015 | 8/1983 | Yamada | 358/284 |
| 4,410,909 | 10/1983 | Ueda et al. | 358/75 |
| 4,467,364 | 8/1984 | Konagaya | 358/284 |
| 4,472,736 | 9/1984 | Ushio et al. | 358/75 |
| 4,591,904 | 5/1986 | Urabe et al. | 358/75 |
| 4,679,074 | 7/1987 | Sugiura et al. | 358/80 |

FOREIGN PATENT DOCUMENTS

| | | |
|---|---|---|
| 2300514 | 7/1973 | Fed. Rep. of Germany. |
| 2725864 | 12/1978 | Fed. Rep. of Germany. |
| 3020201 | 12/1980 | Fed. Rep. of Germany. |
| 3047633 | 10/1981 | Fed. Rep. of Germany. |
| 3101552 | 12/1981 | Fed. Rep. of Germany. |
| 55-147882 | 11/1980 | Japan ................... 358/169 |
| 58-178667 | 10/1983 | Japan ................... 358/280 |
| 2072455 | 9/1981 | United Kingdom .......... 358/280 |

Primary Examiner—James J. Groody
Assistant Examiner—Randall S. Svihla
Attorney, Agent, or Firm—Fitzpatrick, Cella, Harper & Scinto

[57] ABSTRACT

An image processing apparatus comprises an input device for entering an image input signal and a detector for detecting a characteristic, such as contrast, gradation or the like, of the input signal. A converter converts that characteristic of the input signal, in response to the detected characteristic. The converter includes a conversion table addressable by the input signal, and preferably includes a calculator for calculating the conversion table in response to the detected characteristic. Preferably, the converter carries out logarithmic conversion of the input signal. Several such tables may be provided, an appropriate one being selected depending upon input conditions. One or more such tables may have variable contents determined in response to the detected characteristic of the input signal. The converters may each comprise one or more memories storing a respective conversion table addressable by the input signal.

11 Claims, 3 Drawing Sheets

IMAGE PROCESSING APPARATUS FOR LOGARITHMICALLY CONVERTING AN IMAGE INPUT SIGNAL INTO A DENSITY SIGNAL AND STANDARDIZING THE INPUT RANGE OF THE IMAGE INPUT SIGNAL WITH THE SAME CONVERSION TABLE

This application is a continuation of application Ser. No. 023,908 filed 3/11/87, now abandoned, which was a continuation of application Ser. No. 586,069 filed 3/5/84, now abandoned.

BACKGROUND OF THE INVENTION

1. Field of the Invention

The present invention relates to an image processing apparatus, and more particularly to an image processing apparatus capable of reproducing an image with visually natural contrast.

2. Description of the Prior Art

In apparatus for producing a hard copy of an image in response to image signals received from an input device such as a television camera or a CCD sensor, the contrast of the image signals has conventionally been corrected according to the following formula:

$$X_1 = aX + B \qquad (1)$$

In this manner the correction of the contrast is achieved by multiplying and adding constant correction parameters a, B to the input signal X.

However human vision is unable to follow such correcting method.

Such phenomenon will be understood when looking at a light source, for example a celestial body. If a light source is 100 times lighter than another light source, human vision is unable to notice such difference but only feels that the former is a few times lighter.

Consequently such correction by multiplying constant does not match the perception of human vision.

Also there exist various devices for releasing image signals with varied characteristics. Consequently each output device has been equipped with a printer or a memory exclusive for such device. However an increase in the number of printers in proportion to the increase of the devices for electric information handling is definitely undesirable in consideration of cost and space.

Besides a single device may sometimes release image signals of different characteristics according to the nature of the image to be processed. Consequently fixed image processing may cause inconvenience in such device.

SUMMARY OF THE INVENTION

The present invention has been conceived to eliminate the aforementioned drawback in the prior art, and an object thereof is to provide an image processing apparatus capable of correcting the image contrast in a manner to be felt natural to human vision.

Another object of the present invention is to provide an image processing apparatus capable of processing image signals of varied natures with a single processing apparatus.

Still another object of the present invention is to provide an image processing apparatus capable of achieving satisfactory image processing regardless of the characteristic of the input image signal.

Still another object of the present invention is to provide an image processing apparatus capable of automatically achieving image processing suitable for the characteristic of the input image signal.

Still another object of the present invention is to provide an image processing apparatus capable of image processing adapted to an external device generating the image signal to be processed.

Still another object of the present invention is to provide an image processing apparatus capable of achieving satisfactory image processing of the input color image signal.

The foregoing and still other objects of the present invention, and the advantages thereof, will become fully apparent from the following description.

BRIEF DESCRIPTION OF THE DRAWINGS

FIGS. 1 to 3 illustrate a first embodiment of the present invention, wherein FIG. 1 is a block diagram of a control circuit, FIG. 2 is a block diagram of a contrast miodification and complimentary conversion circuit, and FIG. 3 is a flow chart showing the control sequence;

DESCRIPTION OF THE PREFERRED EMBODIMENTS

Now the present invention will be explained in detail with reference to embodiments thereof shown in the attached drawings.

The basic principle of the present invention is represented by the following formula (2):

$$X_2 = \alpha \log X + \beta \qquad (2)$$

wherein X stands for an input image signal, $X_2$ is a corrected image signal, and $\alpha$ and $\beta$ are correction parameters to be determined from maximum and minimum values of the output image signal corresponding to the maximum and minimum values of the input image signal.

The input image signal is subjected to a logarithmic conversion, namely a non-linear conversion in which the conversion factor for a low-level image signal is larger than that for a high-level image signal, thereby obtaining a reproduced image that appears natural to human vision.

1st embodiment

FIG. 1 and the ensuring drawings illustrate an embodiment for practicing the basic principle described above, wherein FIG. 1 shows a block diagram of the control circuit.

Figure 1:
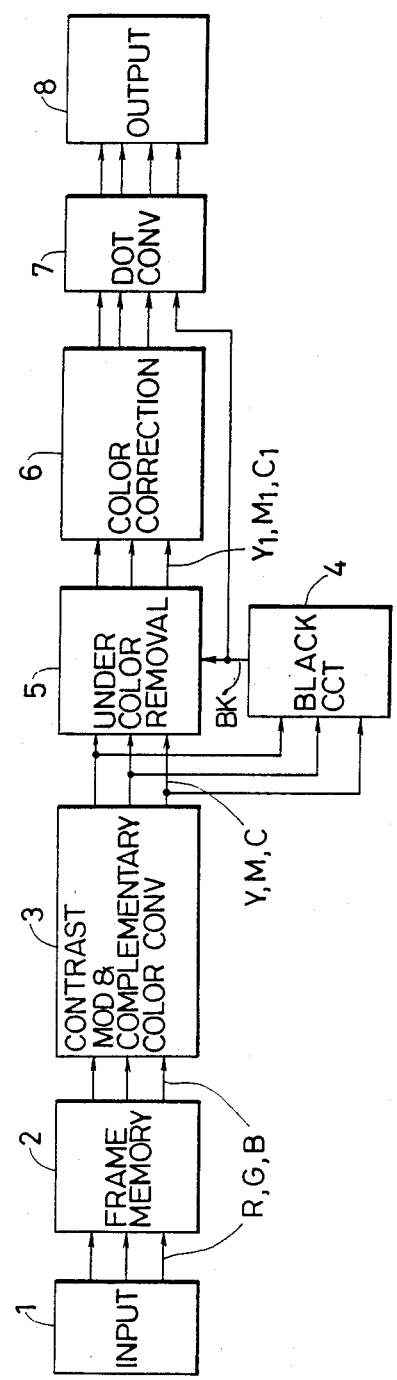

In FIG. 1, an image input device 1 is provided with an image sensor such as a charge-coupled device for photoelectrically reading an original image, and supplies a frame memory 2 with digital image signals R, G, B of determined bits, representing densities of respective colors and obtained by color separation of an object color image through red (R), green (G) and blue (B) filters. Said signals R, G, B are read in succession and supplied to a contrast modification and complementary conversion circuit 3 for the modification of dynamic range and for conversion into digital signals of determined bits representing densities of yellow (Y), magenta (M) and cyan (C) colors which are complementary to the blue, green and red colors.

Said signals Y, M, C are supplied to a black circuit 4 for generating a black signal BK from the minimum value of said signals, and are also supplied to an undercolor removal circuit (UCR) 5 to generate signals Y1, M1, C1 of which signal levels are reduced by an amount corresponding to said black signal BK.

Said signals Y1, M1, C1 are supplied to a color correction circuit for color correction in consideration of the input and output systems, then converted in a dot conversion circuit 7 into dot pattern data to be recorded, and supplied for dot recording by an output device 8 for example a dot printer such as an ink jet printer or a laser beam printer.

Figure 2:
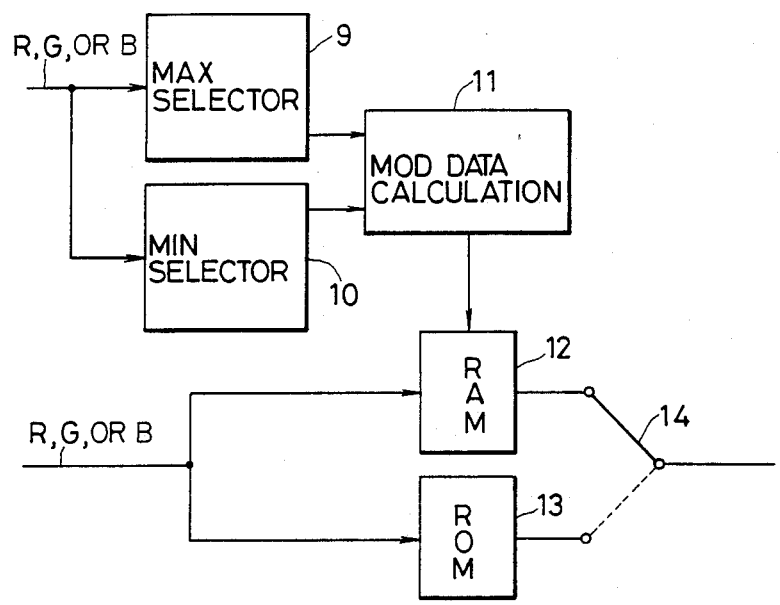

FIG. 2 shows the details of the contrast modification and complementary conversion circuit 3.

The signals R, G, B read from the frame memory 2 are processed separately. Consequently the circuit shown in FIG. 2 has to be provided for each color, or may be used for all the colors on a time-sharing basis. A maximum value selector 9 and a minimum value selector 10 respectively select the maximum and minimum values in the image of a frame or page for each of the signals R, G, B, and the maximum and minimum values thus selected ae supplied to a modified data calculation circuit 11. Said circuit is composed of a microcomputer or a combination of logic elements and calculates modified data correcsponding to the signals R, G, B according to the aforementioned formula (2) and in response to the entered maximum and minimum values. The modified data are stored as a conversion table in a random access memory (RAM) 12.

A read-only memory (ROM) 13 stores, as a conversion table, data modified according to said formula (2) in response to the maximum and minimum values of the signals R, G, B obtained under standard input conditions. A selector switch 14 selects data from the RAM 12 or the ROM 13, and the data selected by said selector switch 14 are released as the output signal from the contrast modification and complementary conversion circuit 3 which may include a γ-correction circuit.

Figure 3:
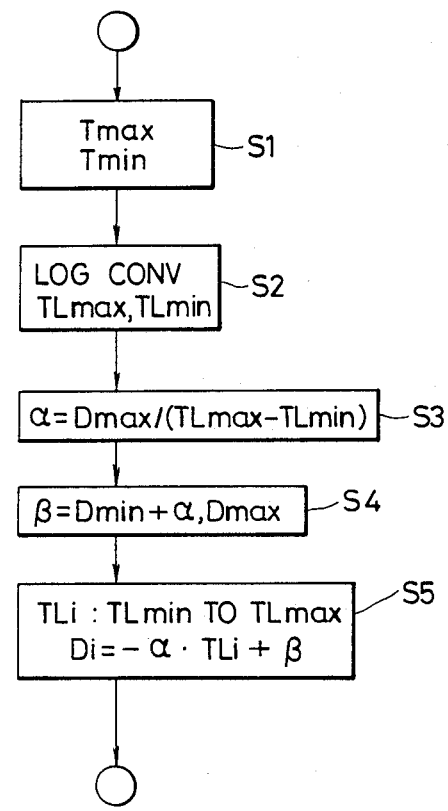

Now reference is made to FIG. 3 for explaining the sequence of image processing in the above-described contrast modification and complementary conversion circuit 3 in which the modified data calculation circuit 11 comprises of a microcomputer. The program shown in FIG. 3 is stored in advance ina ROM incorporated in said microcomputer.

At first in step S1, the image signals of different colors are read from the frame memory 2, and the selectors 9, 10 respectively determine the maximum value $T_{max}$ and the minimum value $T_{min}$ of each of the signals R, G, B stored in the frame memory 2.

In a step S2, the maximum value $T_{max}$ and the minimum value $T_{min}$ are subjected to logarithmic conversion in the modified data calculation circuit 11 to obtain modified values $TL_{max}$, $TL_{min}$.

Said logarithmic conversion may be achieved at a very high speed by the use of a read-only memory in which the address and the content have a logarithmic relationship. Said logarithmic conversion may also be achieved by calculation in a microcomputer or the like if high-speed conversion is not required.

Subsequently step S3 determines the parameter $\alpha$ of the formula (2) according to the following equation (3):

$$\alpha = D_{max}/(TL_{max} - TL_{min}) \quad (3)$$

wherein $D_{max}$ is a predetermined maximum value of the output image signal.

A subsequent step S4 determines the parameter $\beta$ from the parameter $\alpha$ according to the following equation (4):

$$\beta = D_{min} + \alpha D_{max} \quad (4)$$

wherein $D_{min}$ is a predetermined minimum value of the output image signal.

In this manner the steps S3 and S4 determine the parameters $\alpha$, $\beta$ as numerical constants, so that the modified value of the input image signal may be determined according to the formula (2).

A succeeding step S5 prepares a conversion table between the input image signal and the output image signal by calculating a value Di for plural values of the input image signal between $T_{min}$ and $T_{max}$ according to the following equation (5):

$$Di = -\alpha TLi + \beta \quad (5)$$

wherein TL represents a logarithmically converted value of the input image signal level T and D stands for the output image signal.

The output image signal D thus obtained is stored as a conversion table in the modified data RAM 12. The output image signals thus stored are addressed by the input image signals R, G, B supplied again from the memory 2 to effect the contrast modification and complementary color conversion, thus obtaining output image signals D after complementary color conversion for each color.

The negative sign of the parameter $\alpha$ in the equation (5) indicates the inclusion of said complementary color conversion for the colors Y, M, and C complementary to the colors R, G, and B.

On the other hand the ROM 13 stores, as a conversion table, modified data obtained according to the equations (3), (4) and (5) in response to $T_{max}$ (corresponding to black level) and $T_{min}$ (corresponding to white level) under standard or arbitrary input conditions, and can therefore provide modified signals by being addressed by the input image signals in the same manner as in the modified data RAM 12.

The selector switch 14 selects either the modified values stored in the modified data RAM 12 or those of the ROM 13. The ROM 13 is selected for example in case of processing the image signals from input devices in which the dynamic range or the maximum and minimum values of the input image signals are standardized. On the other hand the RAM 12 is selected in case of processing image signals from input devices in which the characteristic of the input image signal is unidentified or is not standardized. Consequently modification can be made according to the characteristic of the input device, and the image processing can be achieved in a manner sufficiently adaptable to various input devices. Also in case the input image signal has a capacity of 8 bits while the output image signal has a capacity of 6 bits, an automatic modification can be carried out by selecting $D_{max}$ as "63" and $D_{min}$ as "0", and such method is applicable to the input and output image signals with an arbitrary number of bits by suitably selecting the levels of $D_{max}$ and $D_{min}$.

In the logarithmic conversion, the result may diverge to infinity if the input signal becomes zero. In the present invention, in order to avoid such occurrence, there is employed a logarithmic conversion in which a constant is added in advance to the input signal, as represented in the equation (6):

$$TL = \log(T + CONST.) \quad (6)$$

wherein TL stands for logarithmically converted data, T stands for the input signal, and CONST is a given constant. In the equation (6), the base if logarithm may be selected arbitrarily.

Such logarithmic conversion, different from conventional conversion by multiplication or addition of a constant, produces a visually natural contrast.

In addition to the above-described logarithmic conversion, there may be considered other logarithmic converting methods. An example of such conversion is to adopt a logarithmic conversion when the input signal exceeds a determined value but to adopt linear conversion when the input signal does not exceed said determined value, as represented by the following equations (7) and (8):

$$TL = \log T \, (T \geq T_H) \quad (7)$$

$$TL = \frac{TL_{TH} - TL_M}{T_H} \cdot T + TL_M \, (T < T_H) \quad (8)$$

wherein $T_H$ is a threshiold value, $TL_{TH}$ is equal to log $T_H$, and $TL_M$ is the minimum value of the logarithmically converted data. Such stepwise logarithmic conversion also allows to obtain visually natural contrast if $T_H$ and $TL_M$ are suitably selected.

In the embodiment shown in FIG. 2, the conversion table is prepared by detecting the maximum and minimum values in the color image signals read from the frame memory 2, but the maximum value selector 9 and the minimum value selector 10 may be positioned between the input device 1 and the frame memory 2 to detect the maximum and minimum values simultaneously with the storage of the image signals in the frame memiory 2. In such arrangement the maximum and minimum values are determined at the completion of storage of the image signals into the frame memory, so that the modified data calculation circuit 11 immediately prepares the conversion table to reduce the waiting time for the image signal processing.

Second embodiment

If the input device releases signals of a determined level, satisfactory data modification and complementary color conversion can be achieved at a high speed only with the ROM 13, without the use of the maximum and minimum value selectors 9, 10, modified data calculation circuit 11 and modified data RAM 12.

Figure 4:
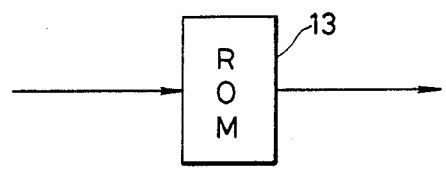
FIG. 4 is a block diagram showing a second embodiment of the present invention.

FIG. 4 shows such embodiment in which the ROM 13 stores the modified data obtained according to the equations (3)–(5) in response to the data $T_{max}$ and $T_{min}$ under the standard or arbitrary input conditons, so that the modified image signals can be obtained by addressing said ROM by the input image signals.

Third embodiment

Figure 5:
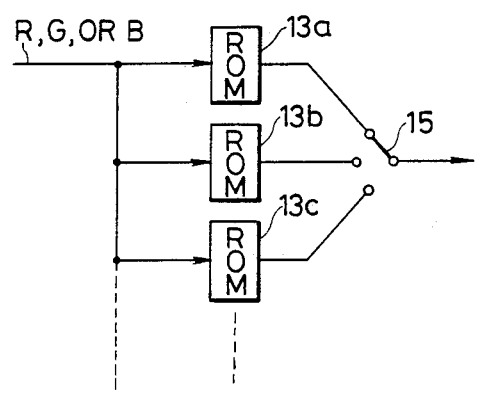
FIG. 5 is a block diagram showing a third embodiment of the present invention.

FIG. 5 shows a third embodiment of the present invention wherein the converting circuit 3 shown in FIG. 1 is provided with plural ROM's 13a–13c which respectively store different conversion tables and which can be selected by a selector switch 15 either manually according to the characteristic of the input and output devices or automatically according to the detection of the maximum and minimum values.

Such structure utilizes plural ROM's 13a–13c for conducting the data modification and complementary color conversion according to several input conditions and contrasts, so that rapid and flexible data modification and complementary color conversion is possible even for image signals from plural input devices of varied input characteristics. Also said plural ROM's may be replaced by a single ROM in which plural memory areas with different conversion tables are selectable.

Fourth embodiment

Figure 6:
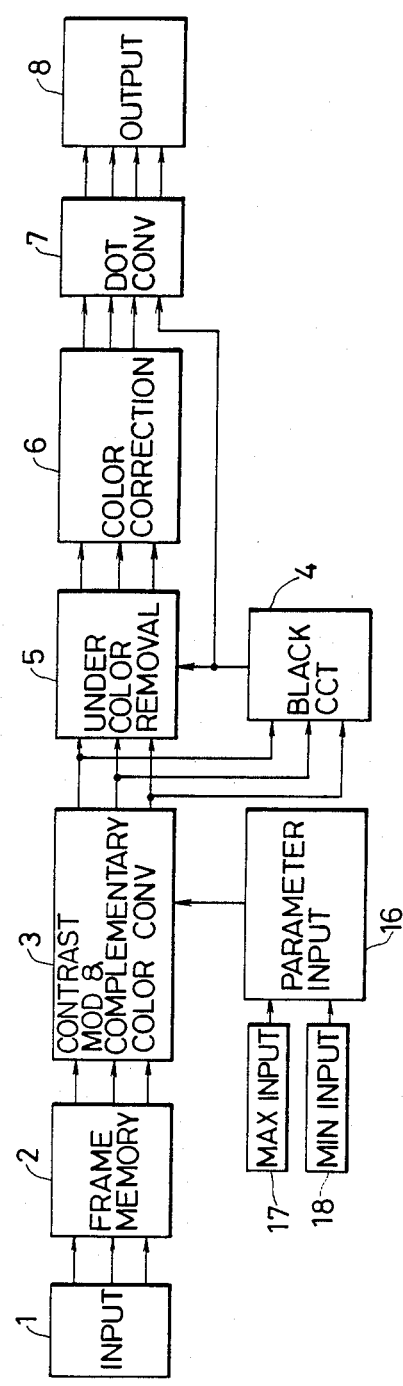
FIG. 6 is a block diagram showing a fourth embodiment of the present invention.

FIG. 6 shows a fourth embodiment of the present invention, wherein the same components are those in FIG. 1 are represented by same numbers.

In the present embodiment a parameter entering device 16 is provided outside, while the maximum and minimum value selectors 9, 10 and the modified data calculation circuit 11 are incorporated in said parameter entering device to enable the operator to externally enter the parameters such as $D_{min}$ and $D_{max}$ from input units 17, 18 according to the characteristic of the input device to be connected. The conversion table is prepared by executing the sequence shown in FIG. 3 according to the externally entered parameters and is stored in the RAM of the converting circuit 3.

Such structure allows an arbitrary contrast modification in a broad range.

In the present embodiment there may be employed various parameters such as the maximum and minimum values of the output data, or the range and maximum and minimum values of the output data, in various combinations to achieve flexible contrast modification.

As explained in the foregoing, a visually natural contrast modification, instead of unnatural image contrast caused by the conventional linear contrast modification, is rendered possible by the use of a modified data memory unit which stores image output data obtained by logarithmic conversion of the input image signal according to image processing parameters determined from the maximum and minimum values of said input image signal, and another modified data memory unit which stores the image output data obtained by logarithmic conversion of the input image signal according to image processing parameters for a standardized input image, said two modified data memory units being selected by a switching means.

Also connection to various input devices releasing image signals of different characteristics is possible since the image signal modification can be conducted according to the input device to be connected. Therefore the efficiency of the output device is improved as it can be connected to plural input devices of different characteristics.

The input device is not limited to the original document reader but can also be a computer, a color television camera, an image file device equipped with a magnetic or opto-magnetic disk etc.

It should be understood that the circuit structure shown in FIG. 1 or FIG. 6 is not limited to the illustrated one but the frame memory or the under color removal circuit may be dispensed with.

Also the conversion table for a standardized input device need not necessarily stored in a ROM but may be loaded in a RAM for example at the start of operation of the apparatus.

Also the converting circuit for the input image signal need not be limited to the conversion table stored in a memory but may be composed of logic hardware.

The present invention is by no means limited to the foregoing embodiments but is subject to various modifications and variations within the scope and spirit of the appended claims.

What is claimed is:

1. An image processing apparatus comprising:
   input means for entering an image input signal;
   detecting means for detecting the input range of the image input signal entered from said input means;
   means for converting a characteristic of the image input signal entered from said input means to a converted characteristic and for producing an image output signal having the converted characteristic in response to the input range detected by said detecting means, said converting means comprising a characteristic conversion table which is addressable by the image input signal entered from said input means to produce the image output signal having the converted characteristic; and
   image forming means for forming an image in response to the image output signal;
   wherein said characteristic conversion table transforms the input range of the logarithm of the image input signal to the output range of the image output signal.

2. An image processing apparatus according to claim 1, wherein said detecting means is adapted to detect the input range by detecting the maximum and minimum values of the image input signal entered from said input means.

3. An image processing apparatus according to claim 1, wherein said converting means is adapted to convert the characteristic of a color image input signal entered from said input means.

4. An image processing apparatus according to claim 1, further comprising calculating means for obtaining said characteristic conversion table in response to the input range detected by said detecting means.

5. An image processing apparatus according to claim 1, further comprising second converting means which comprises a predetermined conversion table which is addressable by the image input signal to produce an image output signal with a predetermined conversion characterstic, and means for selecting one of said converting means and said second converting means.

6. An image processing apparatus comprising:
   input means for entering an image input signal;
   detecting means for detecting a characteristic of the image input signal entered from said input means;
   first converting means for performing conversion of the characteristic of the image input signal entered from said input means;
   second converting means for performing conversion of the characteristic of the image input signal entered from said input means according to a variable converting characteristic determined in response to the characteristic detected by said detecting means; and
   selecting means for selectively activating one of said first and second converting means;
   wherein said first and second converting means respectively comprise first and second memory means each for storing a respective conversion table which is addressable by the image input signal entered from said input means to produce an image output signal with a converted characteristic, wherein said conversion table of said first memory means is a predetermined conversion table and wherein said conversion table of said second memory means is a variable conversion table.

7. An image processing apparatus according to claim 6, further comprising calculating means for preparing said variable conversion table to be stored in said second memory means in accordance with the characteristic of the image input signal detected by said detecting means.

8. An image processing apparatus according to claim 6, wherein said first and second converting means are each adapted to perform logarithmic conversion of the characteristic of the image input signal entered from said input means to a converted characteristic.

9. An image processing apparatus according to claim 6, wherein said input means is adapted to enter a color image input signal.

10. An image processing apparatus according to claim 6, further comprising:
    image forming means for forming an image in response to the image output signal produced by the selected one of said first and second converting means;
    wherein said first and second converting means include conversion characteristics of logarithmic conversion as well as standardizing conversion, said logarithmic conversion representing that the image input signal is converted into a density signal, and said standardizing conversion representing that the input range of the image input signal is standardized to the output range of the image output signal to be outputted to said image forming means.

11. An image processing apparatus according to claim 6, wherein said detecting means detects the input range of the image input signal, and said second converting means determines the variable converting characteristic in accordance with the input range detected by said detecting means.

* * * * *